United States Patent [19]

Bell

[11] 3,895,587
[45] July 22, 1975

[54] RAILROAD CAR FOR TRANSPORTING AUTOMOBILES

[75] Inventor: Richard M. Bell, Arundel, Del.

[73] Assignee: Penn Central Transportation Company, Philadelphia, Pa.

[22] Filed: Sept. 13, 1974

[21] Appl. No.: 505,671

[52] U.S. Cl.... 105/368 R; 214/16.1 R; 214/16.4 R; 296/1 A
[51] Int. Cl.² .......................................... B65J 1/22
[58] Field of Search ............ 105/368 R, 367, 368 B; 296/1 A; 214/16.4 R, 16.4 A, 16 R, 16.1 R, 16.1 EB; 211/49 R; 52/73; 114/72, 75

[56] References Cited
UNITED STATES PATENTS

| | | | |
|---|---|---|---|
| 1,611,419 | 12/1926 | Copony | 114/72 |
| 2,242,635 | 5/1941 | Whittelsey | 114/72 |
| 2,695,568 | 11/1954 | Keith | 105/368 R |
| 3,445,013 | 5/1969 | Scheinert | 214/16.4 R X |

*Primary Examiner*—M. Henson Wood, Jr.
*Assistant Examiner*—Gene A. Church
*Attorney, Agent, or Firm*—Paul & Paul

[57] ABSTRACT

A railroad car is provided for transporting automobiles by rail by carrying the automobile cargo at multiple levels with some of the automobiles on the car floor and with the remaining automobiles resting on horizontal decks cantilevered from vertical structures. The horizontal decks are individual decks extending only the width of the car. The spaces between the decks on which the automobiles rest are sized so that the roof of an automobile on a lower level may protrude through the plane of the next higher deck. The railroad car is designed to permit loading automobiles from either side of the car by use of an external loading mechanism.

12 Claims, 11 Drawing Figures

PATENTED JUL 22 1975  3,895,587

SHEET 1

PATENTED JUL 22 1975          3,895,587
SHEET 2
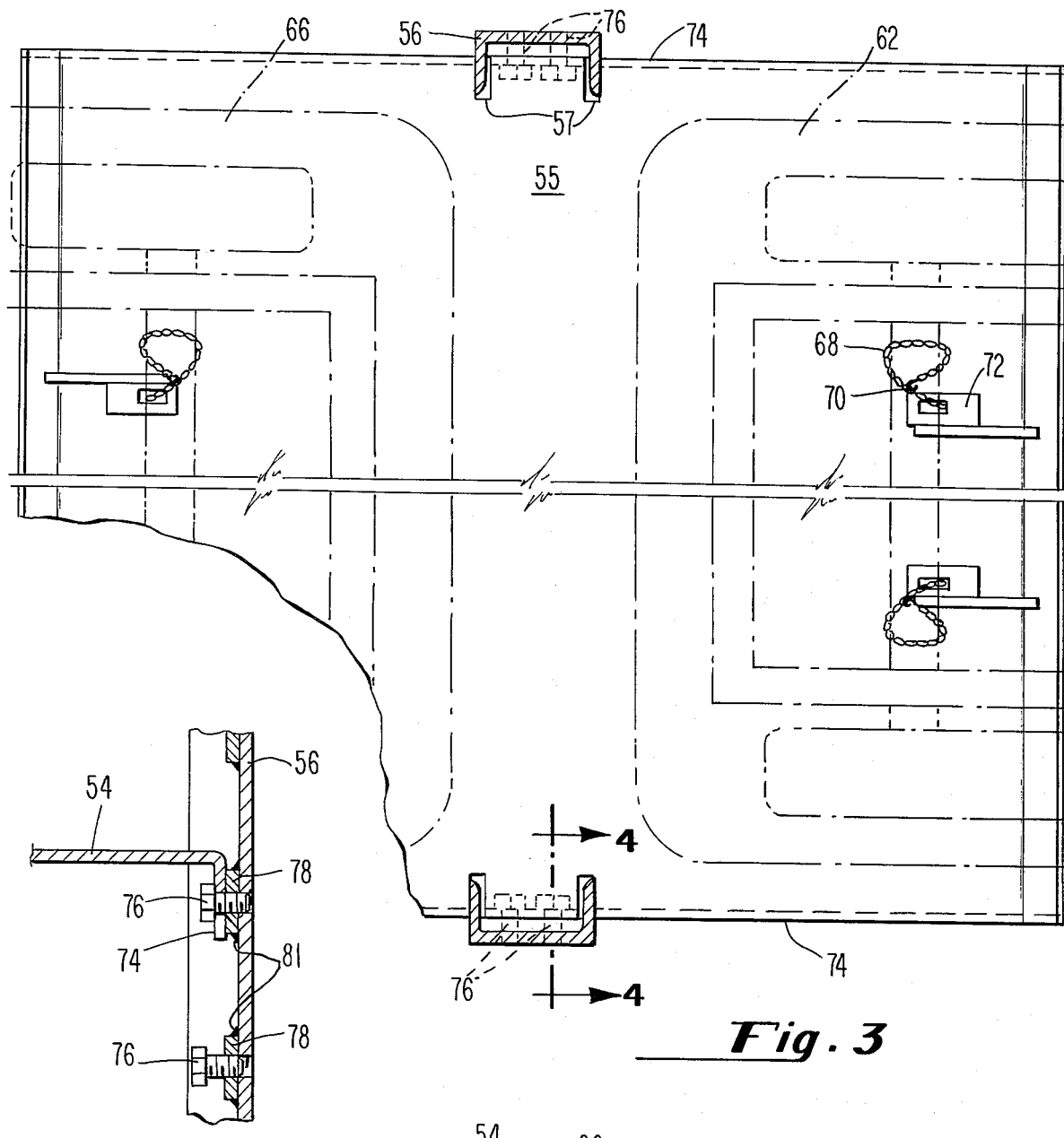
Fig. 3
Fig. 4
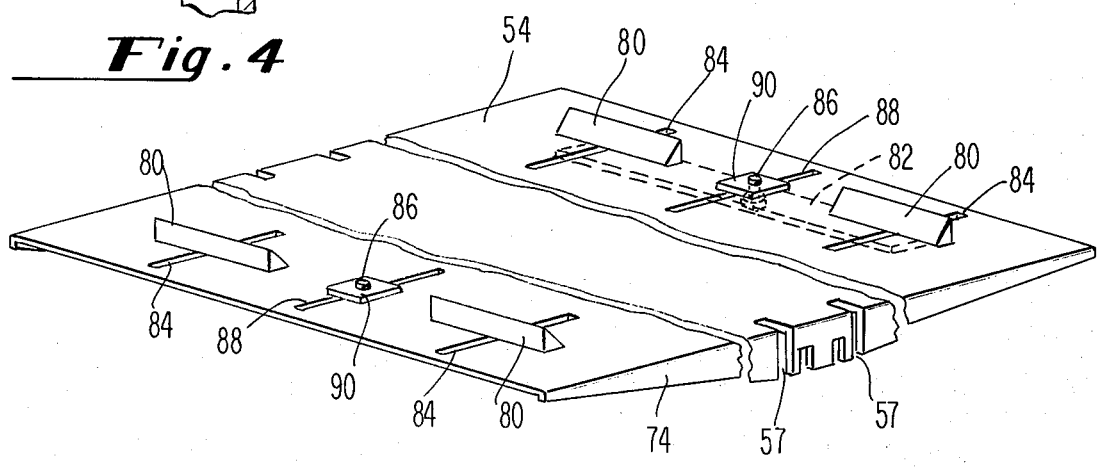
Fig. 5

RAILROAD CAR FOR TRANSPORTING AUTOMOBILES

CROSS-REFERENCE TO RELATED APPLICATION

Cross-reference is hereby made to my copending United States patent application directed to my invention for an Apparatus and Method for Loading Vehicles on Railroad Cars, Ser. No. 505,509, filed Sept. 12, 1974, the disclosure of which is hereby incorporated herein by reference.

BACKGROUND OF THE INVENTION

1. Field of the Invention

This invention relates to railroad cars designed to carry automobiles.

2. Description of the Prior Art

Railroad cars designed to carry a variety of cargo have long been known, with specialized cargo railroad cars first being developed in the early 1830's. When automobiles were first mass produced in the 1920's, they were largely transported via rail in closed boxcar-type cars. Various mechanisms were developed to facilitate the carrying of automobiles in the boxcars. Typical of these is the Automobile Loading Frame shown in U.S. Pat. No. 2,204,032 issued to L.H. Cooper. Later, semitrailer trucks largely displaced railroad cars as the most widely utilized means to transport automobiles.

Economic forces came into play during the 1950's and 1960's which again made the transport of automobiles by rail economically competitive. Various structures were built on standard and oversized railroad flatcars to facilitate the transport of automobiles. Most of the railroad car structures developed during this period for carrying automobiles were open structures which did not protect the automobile cargo either from the weather or from vandalism. Typical of those structures are the railroad cars shown by Sharp in U.S. Pat. No. 3,180,283 and by Baker in U.S. Pat. No. 3,221,669. A serious disadvantage inherent in these types of structures is that the automobiles must be loaded onto the railroad cars in "circus fashion". This means that in order to economically load two or more of the railroad cars with automobiles, it is necessary to have the two or more railroad cars together in a single continuous line. Bridge structures, sometimes consisting of heavy flat steel plates, are placed between the railroad cars at the various levels at which the automobiles are carried, and the automobiles are driven onto the railroad cars from one end of the line of railroad cars to the most remote open spot for an automobile. Accordingly, the railroad cars must be sorted and arranged with all the automobile carrying cars in a single continuous line before loading is economically feasible. Such sorting and arranging disrupts railroad operations.

Recently, the vandalism problem has become more pronounced with high rates of damage to the automobile cargo while in transit becoming the rule rather than the exception. Railroad cars to carry automobiles have been developed utilizing closed structures which largely solve the vandalism problem and shield the automobile cargo from the weather. Typical of these structures are the structures shown in the United State patents issued to Jaekel U.S. Pat. No. 3,661,098 and Pringle U.S Pat. No. 3,667,193. These enclosed railroad car structures shown in the Jaekel and Pringle patents have serious disadvantages which arise from the manner in which the automobiles are carried within the railroad car structure. Neither of these railroad cars permits the automobiles to be transported in a normal orientation. This means that special care must be utilized in designing the automobile to prevent the loss of battery electrolyte, engine oil and other fluids during transport due to the abnormal orientation of the automobile. Additionally, these enclosed structures require complex and expensive external apparatus for loading and unloading the automobile cargo. Another disadvantage inherent in enclosed railroad cars of the prior art is that they must be loaded from both sides of the railroad car. Accordingly, the railroad car must be positioned for loading on a railroad siding which is accessible from either side, where an automobile can be driven up to the side of the railroad car. Such sidings are not common in railroad yards.

SUMMARY OF THE INVENTION

In accordance with the foregoing, it is the primary object of this invention to provide a railroad car for the transport of automobiles which overcomes the disadvantages present in the prior art.

It is a further object of the present invention to provide a railroad car for the transport of automobiles which may be loaded with its automobile cargo from either side and wherein the entire automobile cargo may be loaded from a single side.

It is a further object of the present invention to provide a railroad car for the transport of automobiles where a plurality of the railroad cars can be mixed in a train, with other cars not identical to the railroad cars of the present invention, and wherein the railroad cars still may be loaded in an efficient manner with their automobile cargo.

It is a further object of the present invention to provide a railroad car for the transport of automobile cargo wherein the automobiles are transported in a normal orientation.

It is a further object of this invention to provide a railroad car for the transport of automobiles which is closed and consequently protects the automobile cargo during transit from the elements and from vandals.

It is a further object of this invention to provide a closed railroad car for the transport of automobiles which may be easily loaded with the automobile cargo.

It is a further object of the present invention to provide a closed railroad car for the transport of automobiles where the closed car cannot be easily opened by unauthorized persons during transit.

It is a further object of the present invention to provide a closed railroad car for the transport of automobiles where the automobile need not be driven onto the railroad car.

It is a further object of the present invention to provide structure which can be utilized either on a standard 50 foot railroad flatcar or on an 89 foot railroad flatcar while accomplishing all of the aforementioned objects.

These and other objects of the present invention will become apparent to those of ordinary skill in the art upon study of the appended drawing and upon a reading of the following specification and the appended claims.

In accordance with the preferred embodiment of my invention, I have overcome the problems of the prior art by providing a railroad car for transporting vehicles in an upright condition and positioned in the same direction longitudinally during transport as the longitudinal direction or dimension of the railroad car. These vehicles can be loaded onto the railroad car from a plurality of positions along the side of the car. The preferred embodiment comprises a plurality of horizontal and vertical support structures forming a matrix providing sufficient clearance space for insertion of the automobile or other vehicle into the car from the side. In particular, a plurality of vertical supports are provided fixedly attached to a bed or floor and spaced longitudinally proximate to the longitudinal edges or sides of the railroad car. They are spaced apart a distance at least sufficient to allow the vehicle to be disposed between adjacent vertical supports, to be inserted therebetween without contacting the supports. The horizontal support means are cantilevered members attached to the vertical supports and spaced vertically to provide a clearance space for the automobile or other vehicle which is being inserted onto the railroad car. The horizontal supports extend toward one another a distance at least sufficient to provide a surface upon which the wheels of the vehicle, either front or back, can rest. The cantilevered supports which were adjacent to one another are spaced so as to provide a clearance space for the roof of the vehicle which is positioned beneath them.

BRIEF DESCRIPTION OF THE DRAWINGS

FIG. 3 is an enlarged top section view of a portion of the support structure, taken as indicated by the lines and arrows 3—3 in FIG. 2, where the support structure has been broken away and foreshortened;

FIG. 4 is an enlarged vertical section of a portion of the support structure taken as indicated by the lines and arrows 4—4 in FIG. 3;

FIG. 5 is a foreshortened perspective view of the support deck portion of the support structure shown in FIG. 3, showing an alternative embodiment of means for retaining the automobiles in their respective positions during transit;

DESCRIPTION OF THE PREFERRED EMBODIMENT

Figure 1:
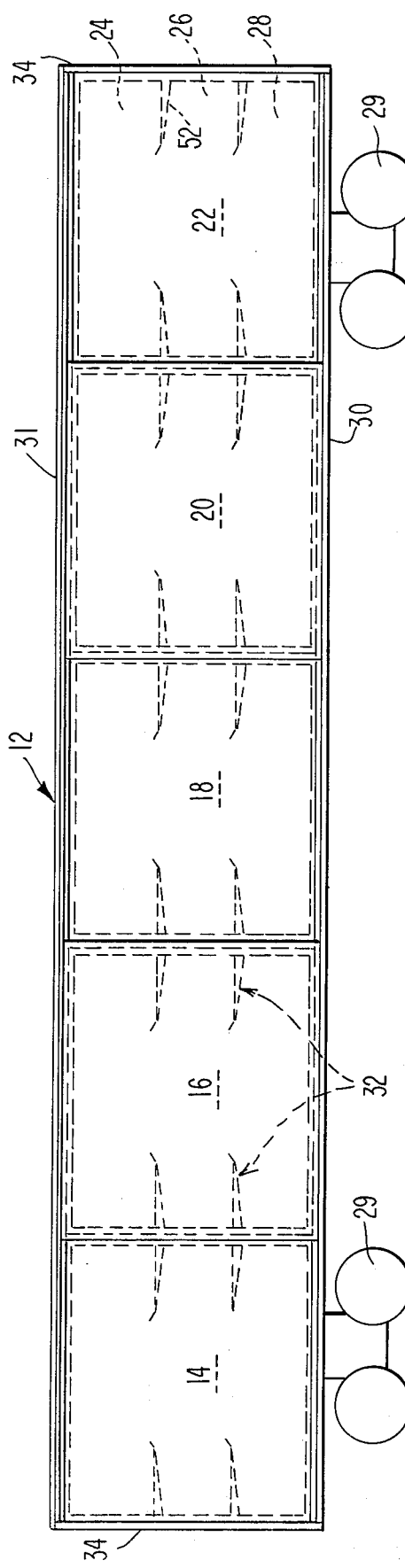
FIG. 1 is a side view of the railroad car for transporting automobiles of the present invention with the doors of the railroad car closed and with the automobile support structures shown in dotted lines.

FIG. 1 shows a side view of the preferred embodiment of the railroad car for transporting automobiles in accordance with the present invention, designated generally 12, and comprising a flat car bed or floor 30 mounted on standard wheel assemblies or trucks 29. There are five automobile storage bays 14, 16, 18, 20 and 22, each bay consisting of three automobile transport areas, such as 24, 26 and 28. The railroad car floor 30, the railroad car roof 31 and two railroad car ends 34 act in conjunction with railroad car side doors to completely enclose the car 12. The support structure for an automobile while it is in its transport area is either two cantilevered automobile support decks, portions of which are designated generally 32, or the railroad car floor 30, depending on the level at which the automobile is stored during transport.

Figure 2:
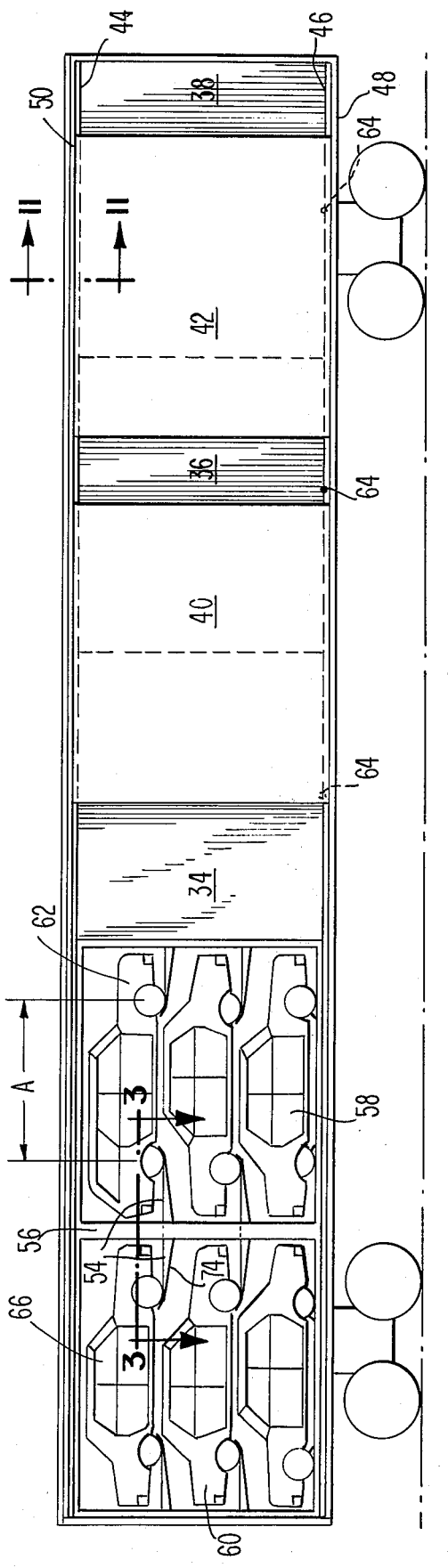
FIG. 2 is another side view of the railroad car shown in FIG. 1 with two of the railroad car side doors displaced to the right, revealing six automobiles which have been loaded into the railroad car.
Figure 11:
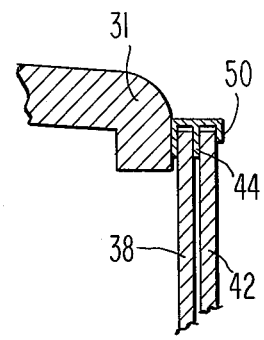
FIG. 11 is an enlarged fragmentary section taken as indicated by the lines and arrows 11—11 in FIG. 2.

The railroad car side doors are shown in FIG. 2, and provide a movable closure means to close off the sides of the railroad car and to provide selective access to the storage bays between the vertical supports. Five doors 34, 36, 38, 40 and 42 are provided, forming the side of the railroad car with one side door enclosing each grouping of automobile transport areas. Two sets of tracks, as shown in FIGS. 2 and 11, are provided for the railroad car side doors to slide along the length of the railroad car, thus exposing or enclosing the automobile cargo. The inner tracks consist of an inner lower track 46 and an inner upper track 44 while the outer tracks consist of an outer lower track 48 and an outer upper track 50. The side doors which close the two automobile storage bays 14 and 22 and the center automobile storage bay 18 are designated as 34, 36 and 38. The doors 34, 36 and 38 are movable back and forth in the inner tracks 44 and 46. The side doors 40 and 42 which enclose the intermediate automobile storage bays 16 and 20 are movable back and forth in the outer tracks 48 and 50.

It is to be understood that identical sets of tracks 44, 46, 48 and 50 are located on either side of the railroad car. Similarly, both sides of the improved railroad car are equipped with sliding doors 34, 36, 38, 40 and 42. Thus, the automobile cargo can be loaded or unloaded from either side of the railroad car or from both sides of the car at once.

The cantilevered automobile support deck indicated generally as 32 may be either a single cantilevered deck attached to the end of the car as indicated by 52 or may be constructed as a double cantilevered deck 54 and secured to two deck support columns 56. The automobile cargo may be stowed in an automobile transport area with the automobile wheels on the car floor as indicated by automobile 58, the automobile may be stowed on a higher level transport area with one set of the automobile's wheels supported by a single support deck and another set of the automobile's wheels supported by one half of a double support deck as shown by automobile 60 or the automobile may be stored in a transport area with its front and its rear wheels supported by two separate double decks as indicated by automobile 62. It will be understood that the horizontal spacing of the cantilevered support decks is governed by the wheel base dimension of the automobiles carried in the railroad car, represented by dimensional figure A in FIG. 2. The improved railroad car is constructed with the cantilevered support decks spaced close enough together so as to adequately support the individual automobiles, but far enough apart so that the roof structure of an automobile on a lower level may protrude into the plane of the automobile support decks on an immediately higher level. It will further be understood that the body styles of some automobiles, such as station wagons, may require that they be loaded only in a top level storage area, as indicated by automobile 62.

Conventional locking means 64 are provided to secure the doors of the improved railroad car so as to prevent entry by unauthorized persons.

FIG. 3 is an enlarged top section view of one of the double support decks 54 which is cantilevered from two deck support columns 56 which are rigidly connected to the car. The double support deck 54 has been foreshortened as indicated by break lines. A front portion of one automobile 66 and a rear portion of another automobile 62 are indicated by phantom lines. A chain 68, hook 70 and standard ratchet tie-down mechanism 72 coact with the individual automobiles 62 and 66 to retain them in a fixed relation with respect to the improved railroad car. It will be understood that four of these mechanisms are used to secure each automobile to the railroad car.

Each support deck 54 has a flange along each outer edge, such as the flange 74, FIG. 3. This flange extends substantially parallel to the longitudinal side of the car and extends vertically downwardly as shown in FIG. 2. The flange 74 and the upper surface 55 of the deck 54 are biforcated by slots 57, FIG. 3, so that they embrace the inwardly depending flanges of the channel support 56. It will be noted that a rather close fit is provided to provide a positive contact between the flanges of the channel support 56 and the section of deck adjoining it. This resists the force moment due to the weight of the car which is positioned on the deck at some distance from the support column 56. The double support deck 54 transfers its vertical load to two support columns 56 via vertical support bolts 76 which pass through the flanges 74 and are screwed through threaded plates 78 and into the vertical support columns 56 as shown in FIGS. 3 and 4. The threaded plates 78 are welded to the vertical support columns 56 as indicated by welds 81, FIG. 4. A plurality of threaded plates 78 are provided spaced vertically along each support column 56 in order that the height of the cantilevered support decks may be changed as required to carry automobiles of different vertical dimensions in the railroad car. Two such threaded plate 78 and vertical support bolt 76 combinations are shown in FIG. 4.

It is to be understood that the single support decks 52 located at either end of the improved railroad car are cantilevered from deck support columns located at the end of each car in the same manner as the double support decks, and accordingly, no drawing of this structure is necessary.

DESCRIPTION OF AN ALTERNATIVE EMBODIMENT OF MEANS FOR SECURING THE AUTOMOBILE CARGO DURING TRANSIT

FIG. 5 shows an alternative embodiment of the means for retaining the automobile cargo in a fixed position with respect to the railroad car during transit. Two wheel retainers 80 are provided for each set of wheels which are supported by the double support deck 54. The wheel retainers 80 are attached to a retainer cross beam 82 which is located beneath the support deck 54. Slots 84 in the support deck 54 permit connection of the wheel retainers 80 and the retainer cross beam 82. A retainer bolt 86 passes through the retainer cross beam 82 and through a third slot 88 and is threaded into threaded retainer plate 90. When an automobile is placed in position on the support deck, the retainer cross beam 82 is advanced until the wheel retainers 80 contact the tires mounted on the automobile wheels. The retainer bolt 86 is then tightened while in threaded engagement with the threaded retainer plate 90 and movement of the automobile cargo is effectively precluded. This method of retention does not provide for protection of the automobile from transverse movement and thus necessitates additional tiedown devices.

It will be understood that a single automobile retention structure assembly of the type shown in FIG. 5 is used for the single decks and for the railroad car floor at the ends of the railrod car.

DESCRIPTION OF AN ALTERNATIVE EMBODIMENT OF THE RAILROAD CAR DOORS

Figure 6:
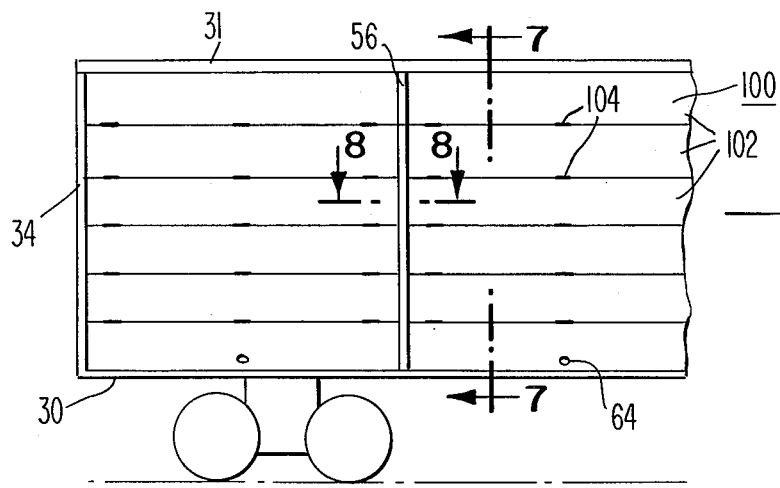
FIG. 6 is a foreshortened side view of an end portion of a railroad car of the present invention illustrating a first alternative embodiment of the railroad car door structure.

An alternative embodiment of the side doors of the railroad car where the doors are movable only in a vertical direction is illustrated in the broken view of FIG. 6. The side doors 100 in this embodiment are of the type commonly referred to as "overhead garage doors" and are comprised of a plurality of solid panels 102 secured together by a plurality of hinges 104. Both the panels 102 and the hinges 104 can be of the standard type conventionally used in standard commercially available overhead garage doors. The railroad car roof 31, the railroad car end 34, the railroad car floor and the door locking means 64 are also shown in FIG. 6. Since the railroad car doors are the overhead garage door type, no tracks are provided for the lateral movement of the railroad car doors back and forth along the side of the railroad car in this embodiment. However, tracks are provided for vertical movement of these doors as described below.

Figure 7:
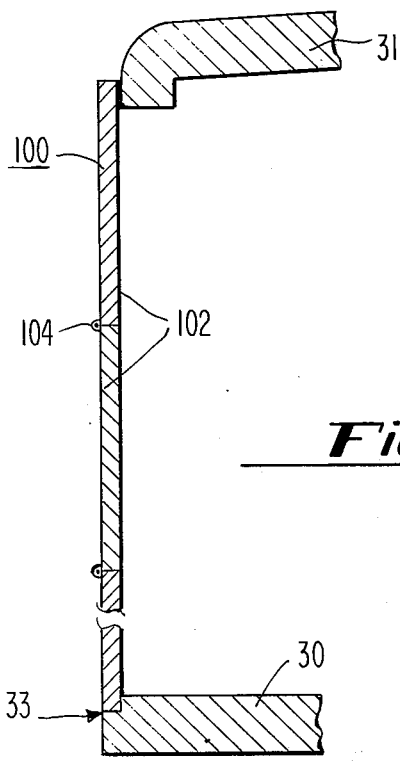
FIG. 7 is an enlarged vertical foreshortened section taken as indicated by the lines and arrows 7—7 in FIG. 6, illustrating the relationship of the railroad car roof, the railroad car floor and the first alternative embodiment of the railroad car doors.

In FIG. 7, the relationship of the railroad car roof 31, the railroad car floor 30, and the overhead door 100 are shown, whereby the overhead door 100 fits into a cut-out 33 in the floor 30 while it overlaps the car roof 31. In this manner, the automobile cargo is effectively sealed in the railroad car.

Figure 8:
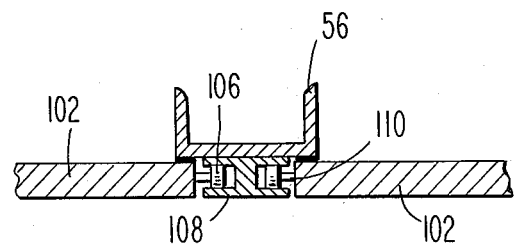
FIG. 8 is a partial section view taken as indicated by the lines and arrows 8—8 in FIG. 6, illustrating the relationship of the vertical support column and the first alternative embodiment of the railroad car doors.

FIG. 8 shows the relationship of the overhead door panels 102, the overhead door wheels 106, the overhead door wheel track structure 108 and the vertical support column 56. In this embodiment, the overhead wheel track structure 108 is secured by appropriate means, such as welding, to the vertical support column 56. The overhead door wheel track structure 108 is suitably sized to receive the overhead door wheels 106 so that the wheels 106 can roll in the tracks. The wheel 106 are connected to the door panels 102 by suitable axle means 110.

DESCRIPTION OF A SECOND ALTERNATE EMBODIMENT OF THE RAILROAD CAR DOORS

Figure 9:
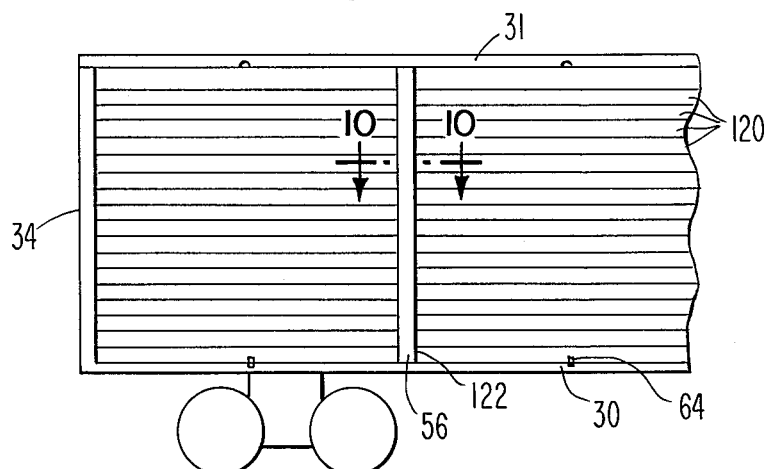
FIG. 9 is a foreshortened side view of an end portion of a railroad car of the present invention illustrating a second alternative embodiment of the railroad car door structure.

FIG. 9 shows another embodiment of the improved railroad car of the present invention, wherein a second different type of overhead door structure is utilized for the railroad car side doors. The railroad car roof 31, the railroad car end 34, the railroad car floor 30 and the door locking means 64 are shown in conjunction with a multi-paneled overhead door indicated generally as a plurality of panels 120. This type of overhead door is also a standard, commercially available item. In this type of overhead door, each of the many panels comprising the door has an integral part thereof two appropriately curved structural extensions designed for mating with identical panels above and below it. When the panels are assembled, no separate hinges are required; rather, the hinges are a portion of the panels 120 themselves. In this embodiment, no wheels are utilized for the door panels. The edges of the door panels fit in an appropriate door retention channel 122.

Figure 10:
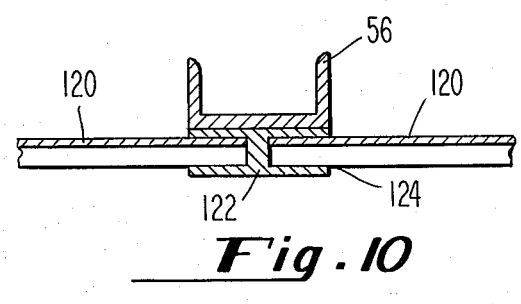
FIG. 10 is a partial section view taken as indicated by the lines and arrows 10—10 in FIG. 9, illustrating the relationship of the vertical support column and the second alternative embodiment of the railroad car doors.

FIG. 10 is a broken sectional view taken along the lines 10—10 as indicated in FIG. 9, showing the relationship of the door panels 120, the door retention channel 122 and the vertical support beams 56. In this embodiment, the door panels 120 fit into the slots 124 which are in the door retention channel 122. The door retention channel 122 is welded to the vertical support column 56. The slots 124 are suitably sized for slidable engagement of the door panels 120.

It is to be understood that each of the two alternative embodiments for the railroad car side doors, as described above, are usuable with either of the automobile retention means which have been described. Likewise the alternative embodiment of means for securing the automobile cargo is usuable with the railroad car sliding door structure shown in FIGS. 1 and 2.

It will further be understood that in order to load and unload the railroad car of the present invention where either of the door structures which are described above, in the description of the alternative embodiments as overhead garage type doors, are used, an external apparatus will be required to raise and lower the railroad car side doors. One such suitable apparatus, which has been specifically designed to load and unload a railroad car with these kinds of doors, is that shown in my copending United States patent application for an Apparatus and Method for Loading Vehicles on Railroad Cars, Ser. No. 505,509, filed Sept. 12, 1974, which has been cross-referenced above. However, it will also be understood that any suitable apparatus can be used to raise these doors.

Although the railroad car for carrying automobiles of the present invention is most suitably built as an 89 foot flatcar specially adapted for this cargo, the structure as described herein is equally appropriate for building on a standard 50 foot railroad flatcar. It is to be understood that the standard 50 foot flatcar equipped with the structure of the present invention would be limited in the horizontal dimension to two or three automobile storage bays, depending upon whether standard size or compact cars are to be carried.

It is to be further understood that any of the embodiments of means to retain the automobile cargo during transit and any of the embodiments of the railroad car side doors herein described could be used equally as well with the standard fifty foot flatcar.

All of the embodiments illustrated and described herein utilize the interior space of a railroad car in a most efficient manner while transporting automobiles in the normal orientation of the automobiles. All of the embodiments of the railroad car described herein can be loaded with cargo from either side of the railroad car and utilize a minimum of mechanical structure to secure the automobile within the railroad car while providing a closed railroad car so as to protect the automobile cargo during transit.

Other uses of the improved railroad car of the present invention and various modifications to the structure of the improved railroad car of the present invention, all within the scope of the appened claims, will be apparent to those of skill in the art from the foregoing. It is particularly to be understood that although the description of the railroad car of the present invention has been drawn in terms of transporting automobiles, the railroad car is equally well suited to transporting all types of veicles, including tractors, trucks, campers, and the like.

What is claimed is:

1. A railroad car for transporting vehicles, comprising:
   a. a floor mounted on trucks;
   b. a plurality of vertical support structures extending upwardly from said floor proximate to the longitudinal edges thereof and spaced longitudinally thereon such that the distance between adjacent supports is greater than the length of the vehicle to be transported therebetween; and
   c. a plurality of horizontal support means for supporting a part of a vehicle, each support means being cantilevered from at least one of said plurality of vertical support structures and each extending longitudinally toward a vertical support structure and horizontal support means a distance sufficient to provide a surface area to support either the front or rear wheels of a vehicle thereon and to provide a clearance between adjacent cantilevered horizontal support means in the horizontal direction, said horizontal support means being spaced vertically between adjacent supports and also between the floor and the first support a distance greater than the height of that portion of the vehicle to be transported therebetween, whereby vehicles may be loaded onto said railroad car in the longitudinal direction of both the car and the vehicle from a plurality of positions along the longitudinal side of the railroad car.

2. The invention of claim 1 wherein movable closure means are provided along the sides of the railroad car to close off the sides from access to the interior thereof and to allow selective access to areas between adjacent vertical supports.

3. The invention of claim 2 wherein a movable closure means are removable vertically to provide said access.

4. The invention of claim 1, wherein said plurality of horizontal support means further comprise a plurality of decks cantilevered from said vertical support structures for supporting a portion of said vehicles, each of said decks extending the entire interior width of said railroad car, said plurality of cantilevered decks being disposed in adjacent pairs to support said vehicles.

5. The invention of claim 4 wherein said decks are disposed such that a pair of adjacent decks lies in a common horiozntal plane.

6. The invention of claim 4 wherein said decks are vertically spaced and horizontally spaced such that the roof of a vehicle at a lower level can protrude through the plane of decks at a next higher level without contacting either a deck or a vehicle on said next higher level.

7. The invention of claim 4, further comprising a plurality of retention means for retaining said vehicles securedly to said decks during transport.

8. The invention of claim 2, wherein said movable closure means comprise:
   a. a plurality of movable doors, the doors being suitably disposed for selectably optionally exposing and enclosing the vehicle cargo within the railroad car; and
   b. a plurality of guide means for guiding the doors as said doors are moved horizontally between optionally selectable positions where in one position the vehicle cargo is completely enclosed within the railroad car and in another position a portion of the vehicle cargo is exposed.

9. The invention of claim 3, wherein said movable closure means comprise: guide means for positioning and guiding a plurality of vertically movable doors forming the longitudinal sides of said car; said guide means comprising a plurality of pairs of vertical tracks; said tracks being fixed to the outer surfaces of said vertical support structures; and a plurality of wheel means, said wheel means being suitably disposed for travel in rolling engagement with said vertical tracks, said wheel means being fixedly secured to said doors.

10. The invention of claim 8, wherein each of said plurality of movable doors further comprises a single panel suitably mounted in said guide means for movement along the side of the railroad car in a longitudinal direction.

11. The invention of claim 4 wherein each of said decks is supported by vertical supports on each side of the railroad car and are connected thereto, and means are provided for changing that connection so that the decks can be disposed at a plurality of vertical positions along said supports.

12. The invention of claim 9, wherein said doors comprise a plurality of longitudinally extending panels interconnected by articulation means.

* * * * *